United States Patent [19]
Bubnash et al.

[11] 4,005,768
[45] Feb. 1, 1977

[54] DUST SHIELD FOR DISC BRAKE
[75] Inventors: Terry L. Bubnash, Dearborn Heights; John C. Haldane, Jr., Northville, both of Mich.
[73] Assignee: Ford Motor Company, Dearborn, Mich.
[22] Filed: Nov. 28, 1975
[21] Appl. No.: 636,183
[52] U.S. Cl. .................. 188/218 A; 188/264 AA
[51] Int. Cl.² ................................. F16D 65/847
[58] Field of Search ............. 188/18 A, 73.1, 73.2, 188/218 A, 264 AA

[56] References Cited
UNITED STATES PATENTS 1,737,325  11/1929  Olivier ........................ 188/218 A
3,354,992  11/1967  Cook et al. .................. 188/218 A X Primary Examiner—Duane A. Reger
Attorney, Agent, or Firm—Clifford L. Sadler; Keith L. Zerschling

[57] ABSTRACT

A dust shield for a disc brake according to the present disclosure has an arcuate portion positioned adjacent an annular braking surface of a disc brake rotor. The arcuate portion of the shield has a plurality of ventilation holes with an annular lip at the periphery of each hole. A plate extends across the arcuate shield portion and is spaced apart from the annular lips. The dust shield permits air to flow about the rotor for cooling purposes while reducing the contamination of the braking surfaces of the rotor by dirt particles carried by splashed road water and air.

10 Claims, 6 Drawing Figures

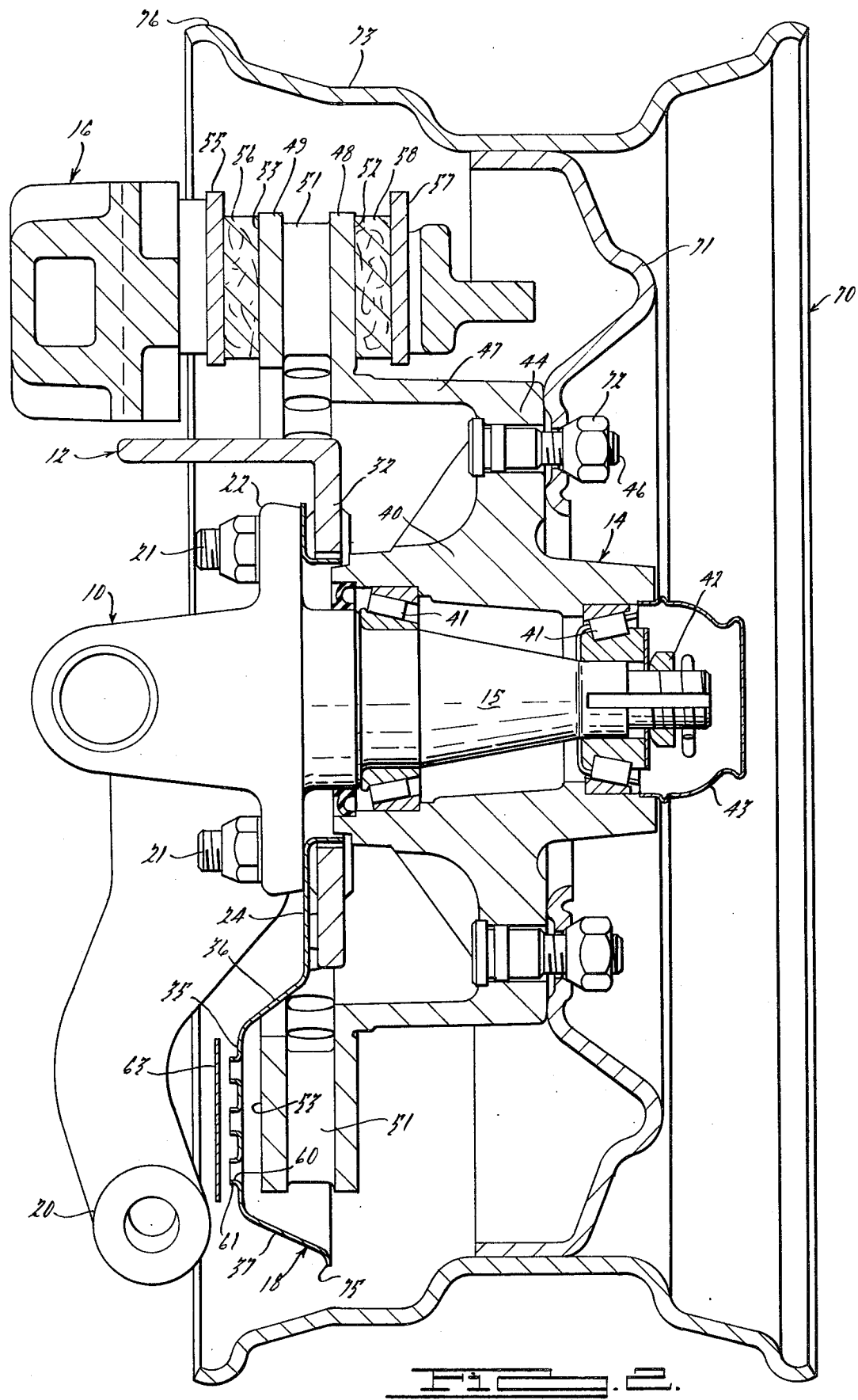

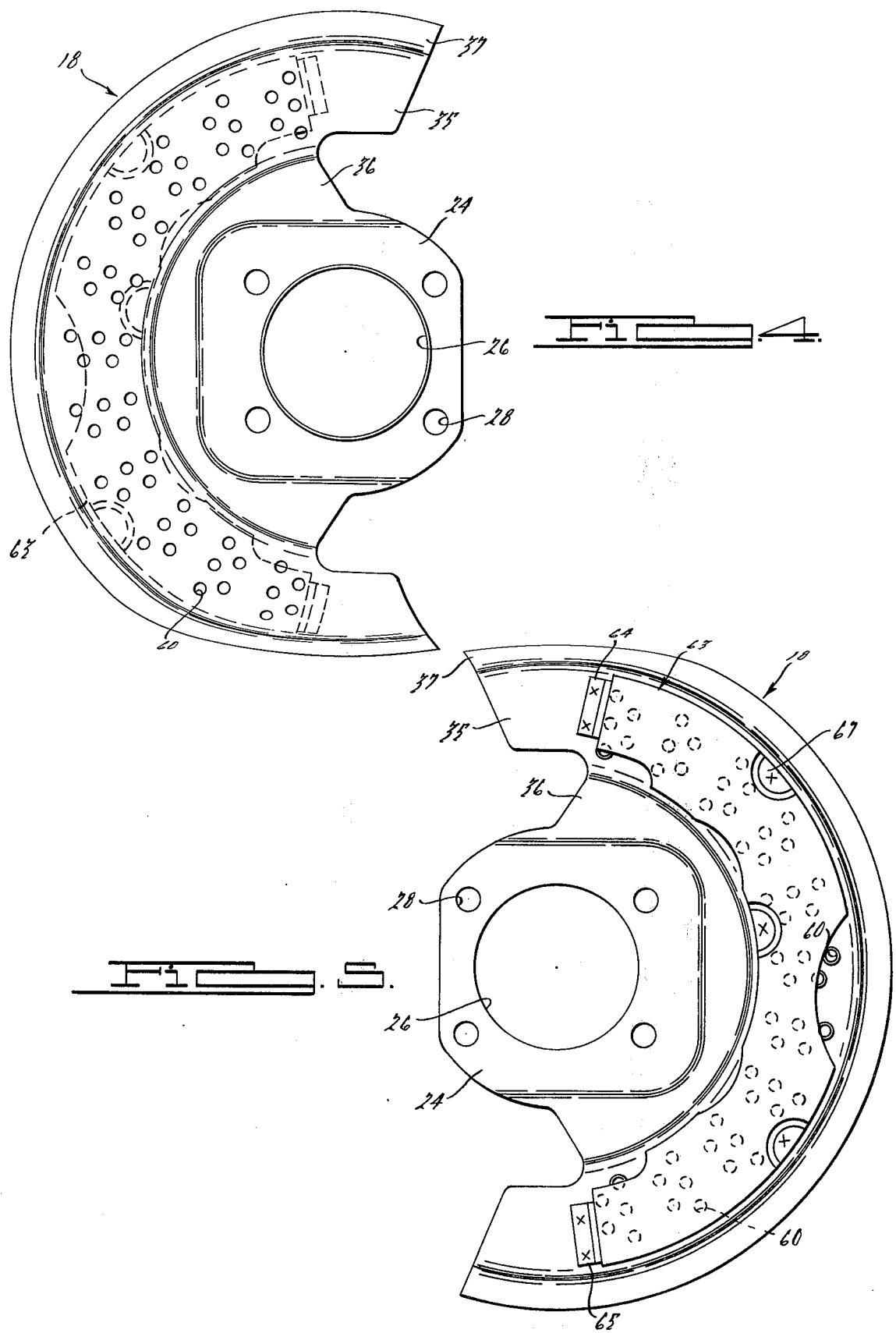

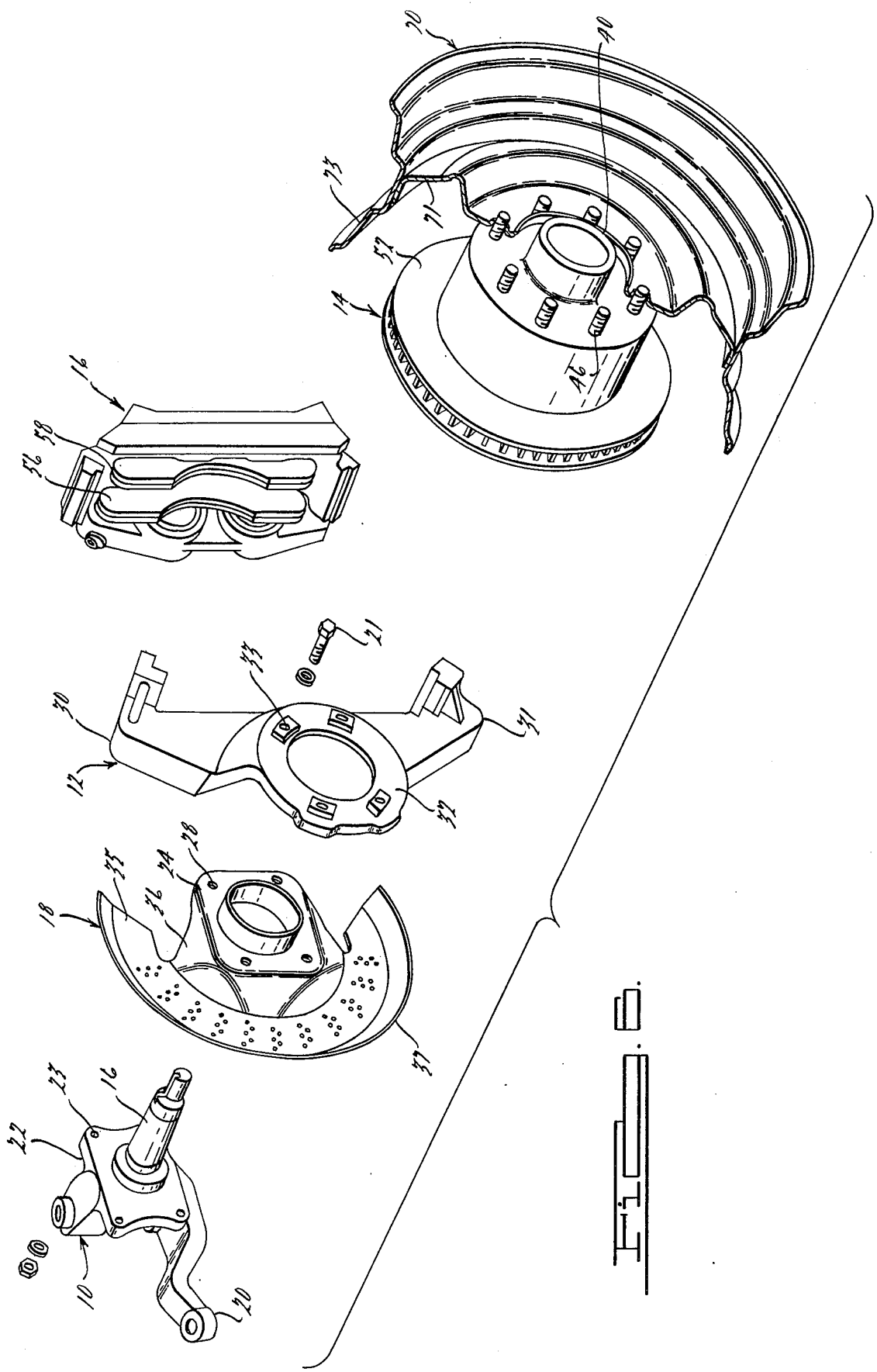

DUST SHIELD FOR DISC BRAKE

BACKGROUND OF THE DISCLOSURE

The present disclosure relates generally to disc brakes for motor vehicles and more particularly to a dust shield for the rotor of a disc brake. Due to the environment in which a disc brake operates, care must be taken to protect the brake components from dirt to the greatest extend that is reasonably possible. In view of the problem presented, the dust shield is designed to prevent road water from being splashed upon the braking surfaces of the rotor and to prevent dust particles carried by air from impinging upon the braking surfaces. These contaminants can cause excessive and uneven wear of the braking surfaces of the rotor and of the brake linings during repeated brake applications.

BRIEF SUMMARY OF THE DISCLOSURE

A disc brake having a dust shield according to the present disclosure includes a rotatable rotor having a pair of annular braking surfaces. It is constructed to rotate with a vehicle wheel which is rotatably supported by a steering knuckle. An anchor plate or support member is rigid with the steering knuckle and slidably supports a brake caliper. The brake caliper straddles the brake rotor and has a pair of brake shoe and lining assemblies adjacent the braking surfaces of the rotor. The caliper includes hydraulic means constructed to force the assemblies into frictional engagement with the braking surfaces.

The dust shield is secured to the steering knuckle adjacent the caliper support member. The shield is positioned next to the braking surface of the rotor closest to the center of the vehicle, e.i. the inboard braking surface. The outboard braking surface is tucked well within the cavity formed by the wheel rim and spider.

The dust shield has a flat arcuate portion with a plurality of ventilation holes juxtaposed the inboard braking surface of the rotor. An annular lip or flange is formed about each of the ventilation holes and extends in a direction away from the brake rotor. An arcuate plate extends across the arcuate portion of the shield and is spaced apart from the annular lips.

In operation, the arcuate plate prevents road water from being splashed through the ventilation holes where it might contaminate the braking surfaces. Air will flow through the gap between the arcuate plate and the arcuate portion and then through the ventilation holes for the purpose of cooling the rotor. The extending lips will tend to prevent dust particles from entering the holes. Cooling air flowing across the surface of the shield will flow over the peripheral lips and through the ventilation holes. Centrifugal force will cause dust particles to flow past the holes as the air makes a sharp turn over the lips and through the holes.

A dust shield for a disc brake according to this disclosure is characterized by its superior performance and its economical manufacture. The dust shield, although of relatively simple construction, effectively reduces the amount of road water that may be splashed against the brake rotor. In addition, dust particles carried by the air are, to a large extent, excluded from the air flowing through the ventilation holes and over the surfaces of the brake rotor.

BRIEF DESCRIPTION OF THE DRAWINGS

The many objects and advantages of a dust shield for a disc brake rotor made in accordance with this invention will become apparent upon consideration of the following detailed discussion when considered in association with the accompanying drawings, in which:

FIG. 2 is a sectional view taken along section line 2—2 of FIG. 1 and, in addition, shows a wheel in section attached to the brake rotor;

FIG. 4 is an elevational view of the dust shield as seen from its outboard side;

FIG. 5 is an elevational view of the dust shield as seen from its inboard side; and FIG. 6 is an exploded view in perspective of the steering knuckle, the dust shield, the anchor plate, the brake caliper, the brake rotor and the wheel.

DETAILED DESCRIPTION OF A PREFERRED EMBODIMENT

Figures 1, 3:
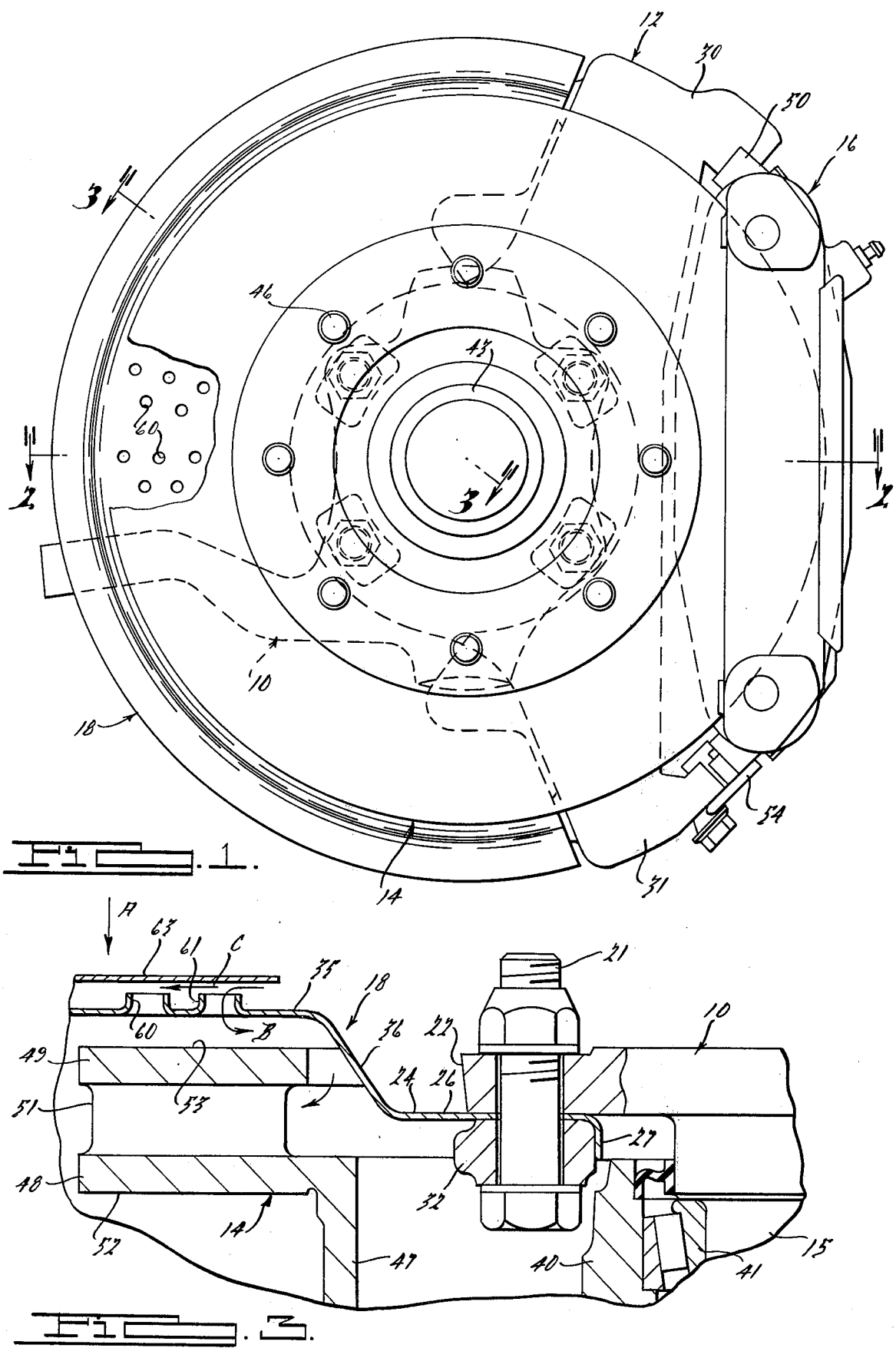
FIG. 1 is an elevational view of a disc brake assembly for the front wheel of a motor vehicle having a dust shield in accordance with the present invention.
FIG. 3 is a sectional view taken along section line 3—3 of FIG. 1.

Referring now to the drawings, wherein the presently preferred form of a disc brake having a dust shield for the brake rotor is disclosed, FIG. 1 shows a brake assembly that includes a steering knuckle 10 to which an anchor plate or support member 12 is rigidly secured. A brake rotor 14 is rotatably supported on the spindle portion or stub shaft 15 of the steering knuckle 10. A brake caliper 16 straddles the edge of the brake rotor 14 and is slidably supported by the anchor plate 12. A dust shield 18 is secured to the steering knuckle 10 and functions to protect the brake rotor 14.

Referring to FIG. 2, the steering knuckle 10 has a steering arm portion 20 that is constructed to be connected to the steering linkage of a motor vehicle. The body of the steering knuckle 10 is constructed to be connected to a front axle or to suspension components of the vehicle. The steering knuckle 10 has a flange 22 with four spaced holes 23. The anchor plate or support member 12 and the dust shield 18 are secured to the flange 22 by four nuts and bolts 21.

Dust shield 18 has a flat inner portion 24 with a central opening 26 that is defined by a peripheral flange 27. Four holes 28 are formed in the flat portion 24 of the shield 18 and these holes are aligned with the holes 23 in the steering knuckle 10. The anchor plate 12 has an annular hub portion 32 from which a pair of spaced arms 30 and 31 extend. The arms 30 and 31 slidably support the brake caliper 16. Four spaced holes 33 in the hub portion 32 are in alignment with the holes 28 of the dust shield and holes 23 of the steering knuckle flange 22. The bolts 21 extend through the holes 33, 28, and 23 and secure the anchor plate 12 and the dust shield 18 to the steering knuckle 10.

The dust shield 18 has an arcuate portion 35, the ends of which are situated adjacent the arms 30 and 31 of the achor plate 12. The arcuate portion 35 is connected to the flat portion 24 of the dust shield by a curved portion 36. An arcuate generally angularly arranged flange 37 extends outwardly from the arcuate portion 35 of the shield 18. As seen in FIG. 2 the angular portion 36, the arcuate portion 35 and the outer flange portion 37 form a trough. These elements of the shield 18 which form the trough are disposed about the inboard braking surface and adjacent portions of the rotor as will be explained.

The brake rotor 14 has a hub portion 40 that is supported by a pair of bearings 41 on the spindle or stud shaft portion 15 of the steering knuckle 10. A wheel nut 42 secures the bearings 41 and the hub 40 on the shaft 15. A cap 43 covers the end of the rotor hub 40 and protects the bearings 41 from contamination. A radial portion 44 of the rotor 14 supports eight wheel studs 46. A cylindrical portion 47 is connected to the portion 44 and to a pair of annular members 48 and 49 that are separated by circumferentially spaced vanes 51. The annular member 48 has an outboard braking surface 52 and the member 49 has an inboard braking surface 53. Passages are defined by the circumferentially spaced vanes 51 which permit cooling air to flow radially outwardly between the annular members 48 and 49 in order to dissipate heat generated during braking.

The brake caliper 16 has an end 50 that is slidably supported by the arm 30 of the anchor plate 12. A releasable retaining device 54 slidably supports the other end of the caliper 16 on the arm 31 of the anchor 12.

The brake caliper 16 carries an inboard brake shoe 55 with a brake lining 56 that is constructed to frictionally engage the inboard braking surface 53. Similarly, an outboard brake shoe 57 has a brake lining 58 that is engagable with the outboard braking surface 52. The brake caliper 16 contains a hydraulic motor that is actuatable by the vehicle operator for the purpose of forcing the brake linings 55 and 56 into frictional engagement with the braking surfaces 53 and 52, respectively.

The annular member 49 of the rotor 14 is recessed within the trough defined by the portions 36, 35 and 37 of the shield 18 with the arcuate portion 35 juxtaposed the inboard braking surface 53. The arcuate portion 35 is provided with a plurality of ventilation holes 60 and the edge of each hole is rimmed by a peripheral lip or flange 61. In the illustrated embodiment of the invention, the dust shield 18 has 25 such ventilation holes each with a peripheral lip. A generally arcuate plate 63 has angled tabs 64 and 65 at each end and several bosses 67 that are spot welded to the arcuate portion 35 of the dust shield 18. The bosses 67 and the tabs 64, 66 are stamped out of the plane of the main body portion of the plate 63 so that when they are spot welded to the dust shield 18, the plate is held in a spaced apart condition with respect to the annular lips 61 (see FIGS. 2 and 3). FIG. 4 shows the side of the dust shield that is adjacent to the braking surface 53 of the rotor 14 and FIG. 5 shows the inboard side of the shield 18.

The construction of FIG. 2 is completed by a wheel 70 which has its spider 71 secured to the rotor 14 by nuts 72 threaded on the wheel studs 46. A wheel rim 73 is welded to the spider 71.

OPERATION

The brake caliper 16 of the present disclosure operates in a reasonably conventional fashion. It includes hydraulic motor means operable by the vehicle operator to force the brake linings 56 and 58 into gripping engagement with the braking surfaces 53 and 52 of the brake rotor 14. When the rotor 14 is gripped by the brake linings 56 and 58, the caliper 14 (being supported on the anchor 12) will cause the rotor and the wheel 70 to be braked.

In certain other brake constructions splashed muddy road water and dust particles carried by air blowing over the rotor may contaminate the braking surfaces 52 and 53 of the rotor 14. Such dirt and dust can cause excessive and uneven wear of the braking surfaces 52 and 53 and of the brake linings 56 and 58 during repeated applications of the linings against the rotor 14. In order to minimize these problems, the dust shield 18 is provided It will be noted from FIGS. 2 and 3 that the trough of the shield 18 defined by the curve portion 36, the arcuate portion 35 and the outer portion 37 is nestled about the annular members 48 and 49 of the rotor 14. The center portion 24 of the shield 18 lies in a plane that approximately bisects the vanes 52. The outer portion 37 of the shield 18 which terminates in a lip 75 substantially encloses the ventilation passages between the vanes 51 of the rotor 14. In addition, the inboard bead 76 of the wheel 70 extends inwardly beyond the shield 18 so as to be in an overlapping relationship therewith (see FIG. 2).

Referring to FIG. 3, in the event road water is splashed toward the rotor 14 in the direction of arrow A, such contaminated water will substantially be prevented from passing through the ventilation holes 60 due to the presence of the plate 63. Thus, the braking surfaces 52 and 53 of the rotor 14 will be substantially protected from contamination by splashed road water. The overlapping relationship of the trough of the shield 18 and the wheel rim 73 contributes to the protection of the braking surfaces 52 and 53.

Cooling air will be directed to the rotor 14 as indicated by the arrow B. This air will be directed to the inner ends of the vanes 51 where it will pass radially outwardly through the passages formed between the vanes 51. Dust particles carried by the air will be propelled past the lip 61 as indicated by arrow C. The weight of the dust particles will cause it to follow the path indicated by arrow C rather than following the path indicated by arrow B with its sharp turn. The plate 63 and its close relationship to the arcuate portion 35 serves to maintain air flow generally parallel to the surface of the portion 35. The annular lips 61 function to separate dust particles from the cooling air so that relatively clean air passes over the braking surfaces 52 and 53 of the rotor 14.

In summary, a disc brake construction is provided in accordance with the present invention that is protected against contamination by air borne dust particles and muddy road water. The rotor 14 is nestled within the spider 71 and rim 73 of the wheel 70 whereby the outboard side of the rotor 14 is protected. Viewing the structure from the inboard side, the rotor 14 is protected principally by the shield 18, and in addition, by the arms 30 and 31 of the anchor 12 and by the caliper 16. From the inboard side, little or no portion of the braking surface 53 of the rotor 14 is visible. Although the rotor 14 is enclosed and protected, the system of ventilation holes 60, peripheral lips 61 and plate 63 provides a means for permitting cooling air to flow to the rotor without carrying with it contaminates that could score the braking surfaces 52 and 53 and cause premature deteriation of the brake linings 56 and 58.

The foregoing description presents the presently preferred embodiment of this invention. Details of construction have been disclosed for purposes of illustration and are not to be considered the limits of the invention. Modifications and alterations of the invention may occur to those skilled in the art that will come within the scope and spirit of the following claims:

We claim:

1. A disc brake having a support member;
a rotatable member constructed to be connected to rotate with a vehicle wheel;
a braking member connected to said support member constructed to brake said rotatable member;
a shield adjacent said rotatable member;
said shield having a plurality of ventilation holes through which air may flow for the purpose of cooling said rotatable member;
said shield having a peripheral lip positioned about the periphery of each of said holes;
said shield being connected to said support member.

2. A disc brake according to claim 1 and including:
a plate secured to said shield and extending across said holes;
said plate being spaced apart from said lips.

3. A disc brake having a brake rotor with a pair of annular braking surfaces;
a brake caliper straddling said rotor;
a support member supporting said caliper;
a shield connected to said support member;
said shield having an arcuate portion positioned adjacent one of said braking surfaces;
said arcuate portion of said shield having a plurality of ventilation holes;
said shield also including a plate extending across said holes and spaced apart from said arcuate portion.

4. A disc brake according to claim 3 and including:
said arcuate portion of said shield having ends disposed adjacent said support member.

5. A disc brake according to claim 3 and including:
said support member having first and second arms slidably supporting said brake caliper;
said arcuate portion of said shield having ends disposed adjacent said arms of said support member.

6. A disc brake having a brake rotor with a pair of annular braking surfaces;
a brake caliper straddling said rotor;
a support member supporting said caliper;
a shield connected to said support member having an arcuate portion adjacent one of said braking surfaces;
said arcuate portion of said shield having a plurality of ventilation holes;
said arcuate portion having an axially extending lip positioned about the periphery of each of said holes.

7. A disc brake according to claim 6 and including:
said support member having first and second arms slidably supporting said brake caliper;
said arcuate portion of said shield having ends disposed adjacent said arms of said support member.

8. A disc brake having a brake rotor with a pair of annular braking surfaces;
a brake caliper straddling said rotor;
a support member supporting said caliper;
a shield connected to said support member having an arcuate portion adjacent one of said braking surfaces;
said arcuate portion of said shield having a plurality of ventilation holes;
said arcuate portion having an axially extending lip positioned about the periphery of each of said holes;
said shield having a plate portion extending across said plurality of holes spaced apart from said lips.

9. A disc brake having a brake rotor with a pair of annular surfaces:
a brake caliper straddling said rotor;
a support member supporting said caliper;
a shield connected to said support member and having an arcuate trough portion disposed about three sides of one of said braking surfaces;
said trough portion having a plurality of ventilation holes and an annular lip positioned about the periphery of each of said holes;
said shield having a plate portion extending across said plurality of holes spaced apart from said lips;
a wheel having a spider portion secured to rotate with said rotor and a rim portion extending axially beyond the inboard limit of said shield.

10. A disc brake according to claim 9 and including:
said pair of annular braking surfaces being spaced apart, in part, by a plurality of circumferentially spaced vanes.

* * * * *